(12) United States Patent
Genevois et al.

(10) Patent No.: US 8,246,322 B2
(45) Date of Patent: Aug. 21, 2012

(54) ELEMENT FOR POSITIONING AND RETAINING AN ELECTRIC MOTOR STATOR IN A COMPRESSOR, COMPRESSOR AND MOUNTING METHOD

(75) Inventors: David Genevois, Cailloux sur Fontaine (FR); Pierre Ginies, Sathonay Village (FR)

(73) Assignee: Danfoss Commercial Compressors, Reyrieux (FR)

( * ) Notice: Subject to any disclaimer, the term of this patent is extended or adjusted under 35 U.S.C. 154(b) by 1072 days.

(21) Appl. No.: 11/921,017

(22) PCT Filed: Jun. 22, 2006

(86) PCT No.: PCT/FR2006/001428
§ 371 (c)(1),
(2), (4) Date: Feb. 14, 2008

(87) PCT Pub. No.: WO2006/136716
PCT Pub. Date: Dec. 28, 2006

(65) Prior Publication Data
US 2009/0252624 A1    Oct. 8, 2009

(30) Foreign Application Priority Data
Jun. 24, 2005  (FR) ...................................... 05 06465

(51) Int. Cl.
*F04B 39/02*    (2006.01)

(52) U.S. Cl. .............. 417/371; 417/410.5; 310/216.135; 310/54; 310/216.049; 310/216.055

(58) Field of Classification Search .................. 417/366, 417/371, 410.5; 418/55.1–55.6; 310/216.135, 310/54, 216.049, 216.055, 216.113, 58, 59, 310/64, 89, 91
See application file for complete search history.

(56) References Cited

U.S. PATENT DOCUMENTS

| | | | |
|---|---|---|---|
| 2,473,904 A | 6/1949 | Rataiczak | |
| 3,462,624 A * | 8/1969 | Darrieus | ......................... 310/51 |
| 4,134,036 A | 1/1979 | Curtiss | |
| 4,593,223 A * | 6/1986 | Lehoczky | ...................... 310/431 |
| 5,873,710 A * | 2/1999 | Tucker | ........................ 417/410.5 |
| 6,517,328 B2 * | 2/2003 | Makino et al. | ............. 417/410.1 |

FOREIGN PATENT DOCUMENTS

| | | |
|---|---|---|
| EP | 0 566 087 A1 | 10/1993 |
| EP | 0 798 465 A1 | 10/1997 |
| EP | 0 855 511 A2 | 7/1998 |
| EP | 1 143 599 A2 | 10/2001 |

\* cited by examiner

*Primary Examiner* — Devon C Kramer
*Assistant Examiner* — Ryan Gatzemeyer
(74) *Attorney, Agent, or Firm* — Oliff & Berridge, PLC (57) ABSTRACT

A positioning and retaining element has a cylindrical rotary belt of substantially constant thickness, having an inner diameter substantially equal to the outer diameter of the stator to be capable of being mounted substantially coaxial clamped about the stator. The positioning and retaining element also has a number of support members projecting radially from the belt outwards and having each a support surface on the housing of the compressor, the support surfaces being located on the lateral surface of a fictitious rotary cylinder of same axis as the other belt and of diameter substantially equal to the inner diameter of the housing, such that the positioning and retaining element can be mounted clamped inside the housing.

19 Claims, 6 Drawing Sheets

ELEMENT FOR POSITIONING AND RETAINING AN ELECTRIC MOTOR STATOR IN A COMPRESSOR, COMPRESSOR AND MOUNTING METHOD

The present invention relates to an element for positioning and retaining an electric motor stator in a substantially cylindrical portion of a compressor shell, to a compressor comprising such an element, and to a method of mounting a motor in a compressor using such an element.

In a known manner, a compressor comprises a sealed enclosure, delimited by a shell, into which an inlet orifice and an outlet orifice for refrigerant fluid open. The enclosure contains a suction volume and a compression volume which are separated by a compression stage comprising a body and which are arranged at one of the two ends of the enclosure respectively.

An electric motor is arranged in the suction volume, with a stator situated on the outside, mounted fixedly with respect to the shell, and a rotor arranged in a central position, rigidly coupled to a drive shaft.

According to a first known embodiment, the stator of the motor is fastened in a skirt secured to the body, or suspended below the body by a clamp which is situated at that end of the motor opposed to the body and fastened by tie rods. In both these cases, to achieve satisfactory and precise positioning of the rotor with respect to the stator, and hence a constant air gap, it is necessary to perform a certain number of operations, in particular delicate machining operations. Consequently, this first embodiment proves to be constraining and costly.

According to a second known embodiment, the stator of the motor is fastened to the shell by means of a positioning and retaining element of annular general shape.

In document U.S. Pat. No. 4,134,036, the intermediate element comprises, as seen in section, a succession of circular portions and outwardly directed curved portions, in the manner of a corrugated sheet which is folded to form a tube. The region of the element that bears on the shell and the region of the element that bears on the stator are radially separated from one another, which means that it is not possible to ensure very good retention. Furthermore, the curved portions have a tendency to deform, with the result that the stator is not optimally centered. Moreover, the mounting operation requires the use of fastening elements.

Document EP 0 798 465 provides an intermediate element comprising thin regions separated by regions which are thickened radially, both inwardly and outwardly, at which the element bears on the stator and on the shell. However, this structure leads to deformations of the thin regions of the element that cannot be readily managed, these deformations having a detrimental effect on the retention quality and, in the long term, possibly resulting in the element being damaged.

The intermediate element described in document EP 0 855 511 comprises, in an intercalated manner, radially inwardly thickened regions on the one hand and radially outwardly thickened regions on the other hand, the latter having a voided inner portion. Apart from its relatively complex structure, this element has the following disadvantages: risk of considerable deformations, and imperfect retention owing to the radial separation between the regions of the element that bear on the shell and on the stator.

The present invention aims to provide a positioning and retaining element whose structure is simpler than that of the known elements, which is less costly and which makes it possible to ensure precise positioning and stable retention of the stator in the shell.

To this end, and according to a first aspect, the invention relates to an element for positioning and retaining a stator of an electric motor in a substantially cylindrical portion of a compressor shell whose inside diameter is greater than the outside diameter of the stator, comprising:

a cylindrical belt of revolution and substantially constant thickness having an inside diameter which is substantially equal to the outside diameter of the stator so that it can be mounted substantially coaxially with clamping around the stator;

a plurality of bearing members projecting radially outwardly from the belt and each having a face for bearing on the shell, said bearing faces being situated on the lateral face of an imaginary cylinder of revolution having the same axis as the belt and having a diameter which is substantially equal to the inside diameter of the shell, such that the positioning and retaining element can be mounted with clamping inside the shell.

The cylindrical shape of revolution and the constant thickness provide the belt with greater strength and with a capacity to deform in regions which are not imposed by its own shape but by those of the stator and the shell as a function of the forces present. This, combined with the shape of the bearing face, makes it possible to ensure that the motor is positioned and retained in a very satisfactory manner.

By "substantially equal" is meant that the inside diameter of the belt can be equal to the outside diameter of the stator, or else be slightly smaller or slightly greater (difference, for example, of around 0.1 to 0.5% according to the motor diameters), to provide a clamping of around 0.1 to 1 mm.

Furthermore, the positioning and retaining element allows a better transfer of the stator losses of the electric motor toward the shell of the compressor, and hence a better evacuation of these losses by the ambient air around the compressor. This makes it possible to reduce overheating of the sucked-in gases and therefore improve the efficiency of the machine. The improvement in this thermal transfer is obtained through the choice of thicknesses for the belt, the projecting bearing members and the faces which bear on the shell.

According to one possible embodiment, at least one bearing member comprises an arm extending radially outward from the belt and a pad arranged at the outer end of the arm, said pad having the shape of a cylinder portion which is coaxial with the belt and extends over an angle of between 5 and 40°, or even between 10 and 25°.

As seen in cross section, the bearing member can have a T shape, the width of the arm being between 15 and 35% of the width of the pad. In a variant, the width of the arm can be greater than 60% of the width of the pad.

For example, at least one bearing member consists of a locally thicker portion of the belt, forming a solid or hollow boss.

The radial length of the bearing members can be between 8 and 50 mm.

According to one possible embodiment, the positioning and retaining element comprises a plurality of sets of at least one bearing member, said sets being substantially equally distributed around the periphery of the belt. A set comprises, for example, two bearing members which can be radially separated by less than 15°.

According to one embodiment, the belt is open and extends over an angle above 270°.

Advantageously, the positioning and retaining element is obtained by extrusion and then cutting to a predetermined axial height.

According to a second aspect, the invention relates to a compressor of the type comprising:
- a substantially sealed enclosure delimited by a shell comprising at least one substantially cylindrical portion;
- an electric motor arranged inside the substantially cylindrical portion of the shell, said motor comprising a stator whose outside diameter is smaller than the inside diameter of the shell; and
- a positioning and retaining element as described above, said element being mounted substantially coaxially, with clamping, around the stator on the one hand and inside the shell on the other hand.

Advantageously, the bearing members are arranged on the belt substantially in line with the bearing regions between said belt and the stator.

The outer face of the stator can be substantially cylindrical.

In a variant, it can be substantially cylindrical except for at least one flat, the bearing members being arranged facing the cylindrical portion or portions of the stator. For example, the outer face of the stator comprises a number N of substantially identical flats equally distributed around the periphery of the stator and separated by cylindrical portions forming the bearing zones between the belt and the stator, at least one bearing member being arranged in line with each cylindrical portion of the outer face of the stator. N is, for example, between 1 and 8. Provision may be made, at the location of at least one cylindrical portion of the outer face of the stator, for the positioning and retaining element to comprise two angularly separated bearing members each arranged in line with an edge between said cylindrical portion and an adjacent flat.

Finally, according to a third aspect, the invention relates to a method of mounting an electric motor in the enclosure of a compressor, comprising the steps consisting in:
- providing a substantially sealed enclosure delimited by a shell comprising at least one substantially cylindrical portion, a stator of an electric motor whose outside diameter is smaller than the inside diameter of the shell, and a positioning and retaining element as described above;
- mounting said element around the stator substantially coaxially;
- mounting the stator/element assembly inside the shell substantially coaxially, with clamping;
- producing a clamping effect between said element and the stator.

In the mounted state, in order to make it possible for the motor to be retained in the shell, the element must be clamped round the stator. This can be obtained by an initial clamping of the belt around the stator prior to installing the stator/element assembly inside the shell. This clamping effect between the element and the stator can be obtained by mounting the element around the stator with force or by mounting the element, which has been thermally expanded beforehand, around the stator and then cooling the element, causing the material constituting said element to shrink.

In a variant, it is possible for the belt not to be initially clamped around the stator, but simply placed around the latter on a support, or even adhesively bonded around the stator. In this case, the clamping effect between the stator and the element results from the clamping effect between the element and the shell.

The method can additionally comprise the steps consisting in:
- providing a stator having a substantially cylindrical outer face with the exception of at least one flat;
- applying an inwardly directed substantially radial force to the belt of the element, at the location of a deformation region not situated in line with a bearing member, so as to elastically deform said belt;
- placing the stator and the element in a substantially coaxial manner and in a mutual angular orientation such that the flat is substantially axially aligned with the deformation region;
- inserting the stator into the element;
- releasing the force applied to the belt so that the belt is mounted around the stator with a tight fit.

A number of possible embodiments will now be described by way of nonlimiting examples with reference to the appended figures:

FIG. 7b is a view in cross section of a cylindrical stator of revolution equipped with the element shown in FIG. 7a;

Figure 1:
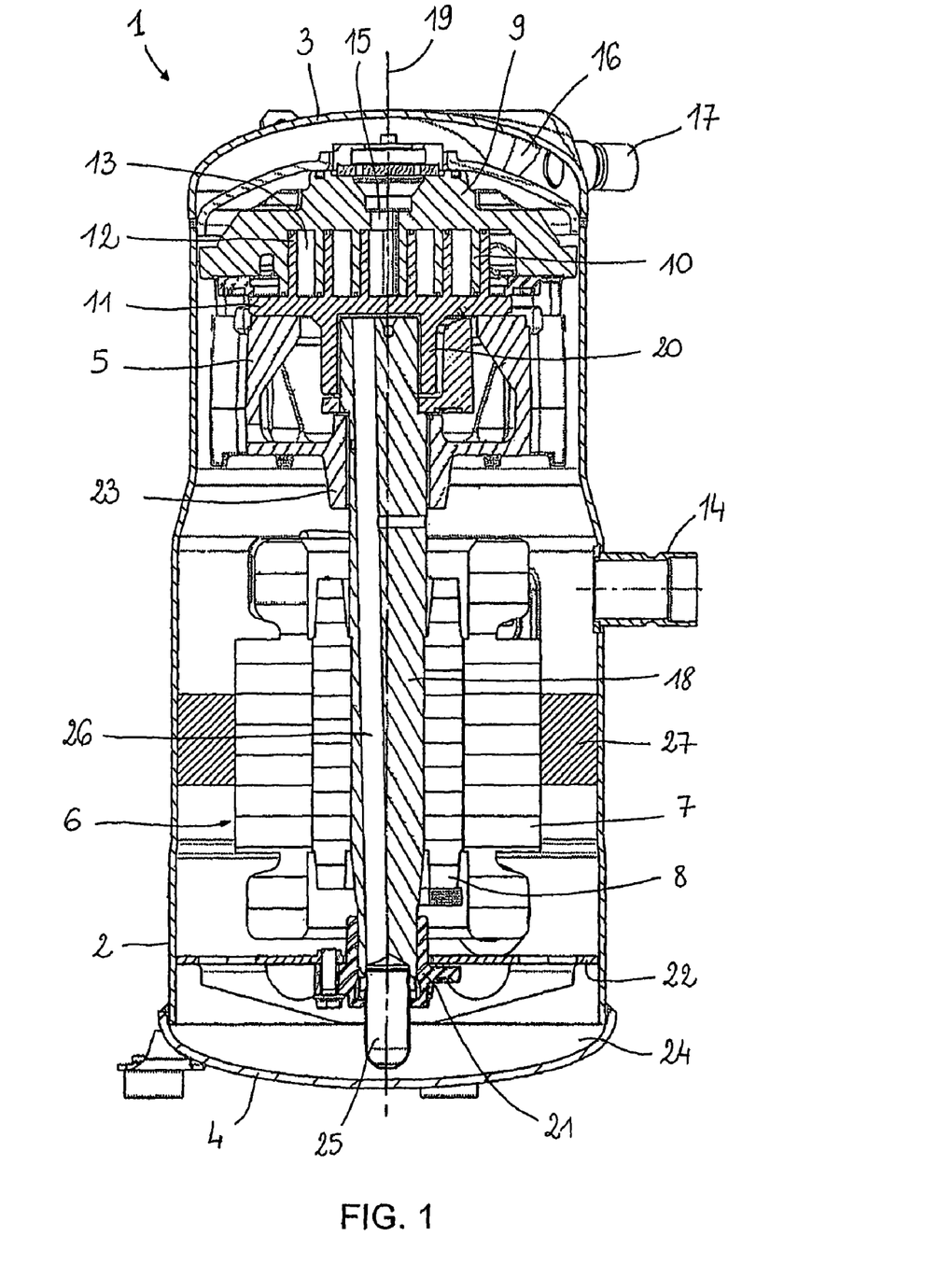
FIG. 1 is a view in longitudinal section of a compressor comprising a motor and a positioning and retaining element according to the invention.

FIG. 1 represents a scroll-type refrigerating compressor 1 occupying a vertical position. However, the compressor according to the invention could occupy an inclined position, or a horizontal position, without its structure being modified. It could also be another type of compressor.

The compressor 1 comprises a sealed enclosure delimited by a shell 2 whose upper and lower ends are closed by a cover 3 and a base 4, respectively. In the intermediate part of the compressor 1 is situated a body 5 which delimits two volumes, a suction volume situated below the body 5, and a compression volume arranged above it.

The compressor 1 also comprises an electric motor 6 comprising a stator 7, of outside diameter De7, with a rotor 8 arranged in its center.

The body 5 serves for mounting a gas compression stage. This compression stage comprises a fixed volute 9 equipped with a downwardly facing fixed scroll 10, and a moving volute 11 equipped with an upwardly facing scroll 12. The two scrolls 10, 12 of the two volutes 9, 11 interengage so as to form variable-volume compression chambers 13.

The gas is supplied by an inlet pipe 14 which opens into an upper part of the suction volume of the compressor 1 through an inlet orifice formed in the shell 2. The compressed gas escapes from the center of the volutes through an opening 15 toward a chamber 16, from which it is discharged through an outlet orifice formed in the cover 3, connected to an outlet pipe 17.

To the rotor 8 is secured a shaft 18 of axis 19 whose upper end is off-centered in the manner of a crankshaft. This upper part is engaged in a sleeve-shaped part 20 belonging to the moving volute 11. As it is rotated by the motor 6, the shaft 18 drives the moving volute 11, which is guided by means of a connecting element relative to the fixed volute 9, in an orbital movement.

The shaft 18 is guided with respect to the other parts by means of a lower bearing 21 formed in a centering part 22 fastened to the shell 2 and by means of an upper bearing 23 formed in the body 5. The base 4 delimits a casing 24 containing an oil bath in which there is immersed the end of the intake duct of the pump 25, which supplies lubricating oil to the various bearings by means of a duct 26 which is inclined with respect to the axis of the shaft.

The motor is not fastened to the body 5, but directly to the shell 2, at a cylindrical portion thereof whose inside diameter Di2 is greater than the outside diameter of the stator De7, via a positioning and retaining element 27. This element 27 is made of metal, for example aluminum. It can be obtained by extrusion and then cutting to a predetermined axial height.

Figure 2:
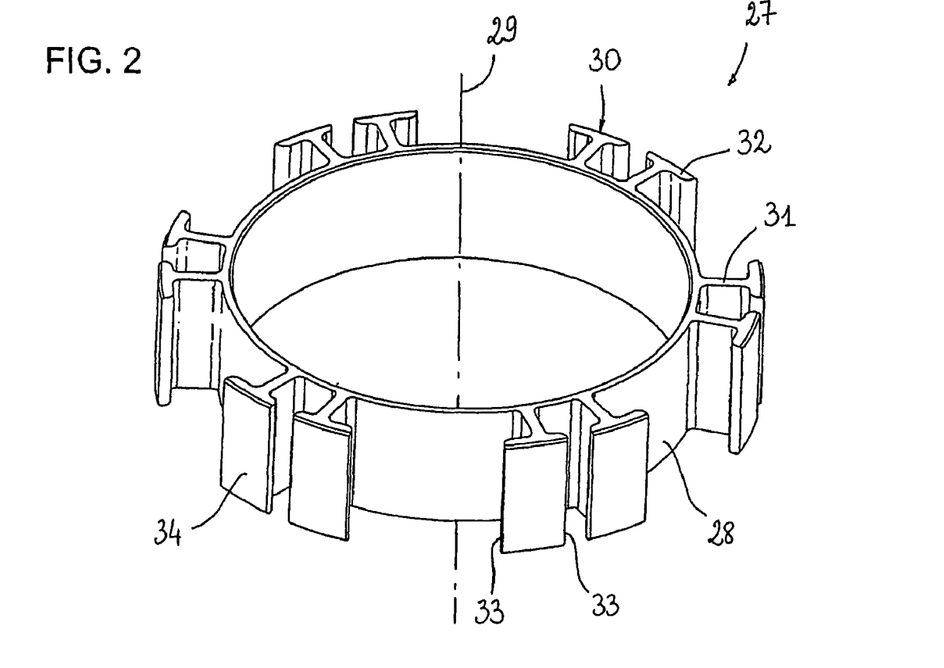
FIG. 2 is a perspective view of a positioning and retaining element according to a first embodiment.
Figure 3:
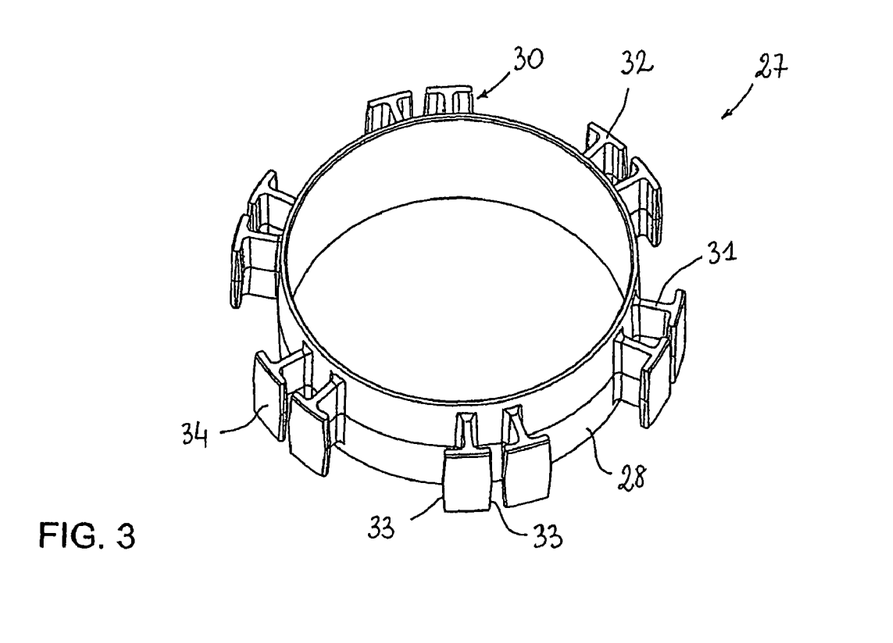
FIG. 3 is a perspective view of an element according to a variant of the first embodiment.

A first embodiment of the positioning and retaining element 27 is illustrated in FIGS. 2 and 3.

This element 27 first of all comprises a cylindrical belt 28 of revolution, of axis 29, whose inside diameter Di28 is substantially equal to the outside diameter De7 of the stator 7. The thickness e (radially) of the belt 28 is substantially constant. The height (axially) and the thickness e of the belt 28 are small in comparison to its diameter. The dimensions of the belt 28 depend of course on the dimensions of the stator 7 and the shell 2, but, by way of example, they may be as follows:
 inside diameter Di28: from 140 to 200 mm;
 height: from 40 to 130 mm;
 thickness: from 3 to 10 mm.

In the embodiment represented in the figures, the height of the belt 28 is less than the height of the stator 7. However, it is also conceivable for the height of the belt 28 to be substantially equal to or even slightly greater than the cylindrical central region of the stator 7 (stack of laminations). This would result in the stator being fastened and retained over a large part of its height.

The element 27 also comprises a plurality of substantially identical bearing members 30 projecting radially outwardly from the belt 28. Each bearing member 30 comprises an arm 31 extending radially from the outer face of the belt 28. The arm 31 has a substantially rectangular cross section in a plane orthogonal to the axis 29, and extends over the full height of the belt 28.

At the outer end of the arm 31 is arranged a pad 32 having the shape of a cylinder portion which is coaxial to the belt 28 and bounded by two rectilinear edges 33 parallel to the axis 29 and separated angularly by approximately 10°. The pad 32 additionally possesses an outer face forming a bearing face 34. The bearing faces 34 of the bearing members 30 are situated on the lateral face of an imaginary cylinder of revolution of axis 29 having an outside diameter De34 substantially equal to the inside diameter Di2 of the shell 2. The bearing members 30 thus have a T shape, as seen in section orthogonal to the axis 29. By way of example, the length (radially) of the bearing members 30 can be between 8 and 50 mm, and the width of the arm 31 can be between 3 and 12 mm.

In the embodiment represented in FIG. 2, the element 27 comprises six sets of two bearing members 30. The sets are equally distributed over the periphery of the belt 28, two consecutive sets being spaced apart by an angle close to 40°. Each set comprises two bearing members 30 with a slight angular separation.

The variant represented in FIG. 3 differs from the embodiment shown in FIG. 2 through the following points: the arms 31 do not extend over the full height of the belt 28, and the edges 33 of the pads 32 are not rectilinear but in the form of a very flattened V whose tip is directed toward the outside of the pad 32. This part can advantageously be obtained by molding, sintering or casting.

The element 27 is mounted coaxially around the stator 7 with sufficient clamping to enable the motor 6 to be retained in the compressor 1.

Figure 4:
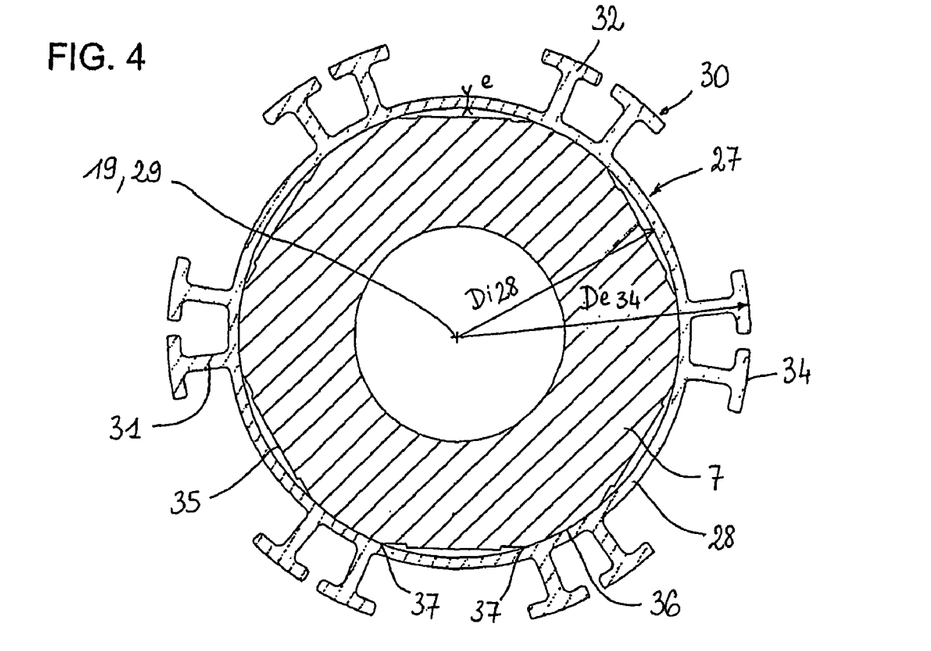
FIG. 4 is a view in cross section of a stator comprising flats and equipped with the element shown in FIG. 2.
Figure 5:
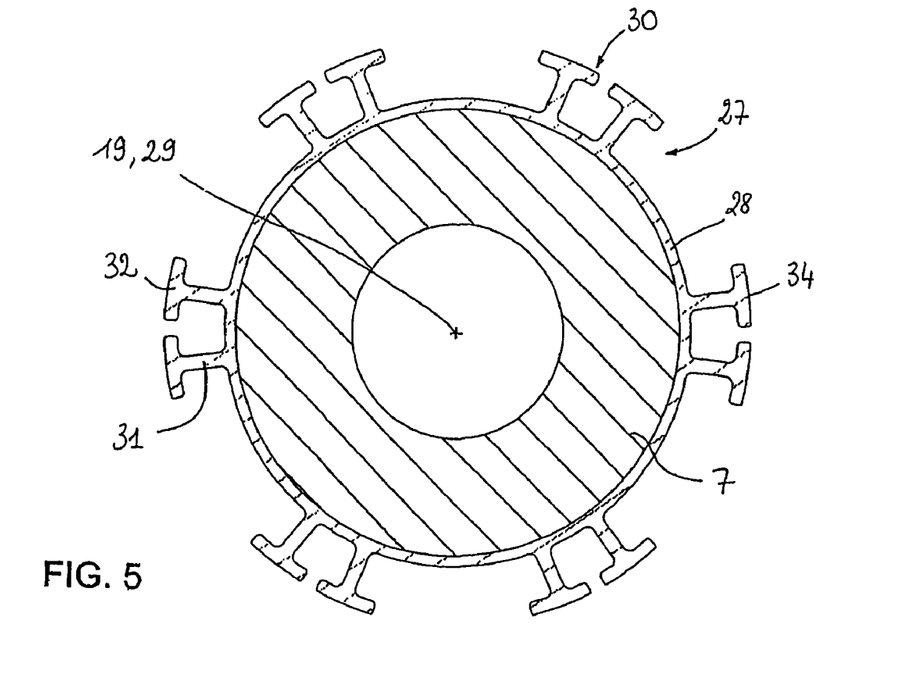
FIG. 5 is a view in cross section of a cylindrical stator of revolution equipped with the element shown in FIG. 2.

The stator 7 can be a cylindrical stator of revolution (FIG. 5) or provided with flats 35 (FIG. 4). These flats 35 are generally equally distributed around the periphery of the stator 7 and separated by cylindrical portions 36 of the outer face of the stator 7. In the case of a stator provided with flats, the number of sets of bearing members 30 is preferably equal to the number of flats 35. The distribution of these sets around the belt 28 on the one hand and the mounting of the belt 28 on the stator 7 on the other hand are such that a set of bearing members 30 is situated in line with a cylindrical portion 36 of the stator 7. Preferably, the bearing members 30 are situated in line with an edge 37 between a cylindrical portion 36 and a flat 35.

A number of solutions are possible to obtain the clamping of the belt 28 around the stator 7. Provision may be made in particular for the inside diameter Di28 of the belt 28 to be slightly smaller than the outside diameter De7 of the stator, and:
 either for the element 27 to be mounted around the stator 7 with force (the inside diameter Di28 of the belt being slightly smaller than the outside diameter De7 of the stator 7);
 or for the element 27 to be heated prior to mounting it around the stator 7, so as to expand it and facilitate its mounting, and then for the element 27 to be cooled once in place in order to produce a shrinkage of the material constituting the element 27 and a clamping around the stator 7. This method is especially used in the case of an element 37 made of aluminum (differential expansion with the stator). It avoids damage to the belt 28 subsequent to a mechanical deformation.

Another method—applicable only in the case where the stator 7 comprises at least one flat 35—consists in applying an inwardly directed substantially radial force to the belt 28, at the location of a deformation region not situated in line with a bearing member 30, so as to elastically deform the belt 28, and then placing the stator 7 and the element 27 in a substantially coaxial manner and in a mutual angular orientation such that the flat 35 is substantially axially aligned with the deformation region and, once the stator 7 has been inserted into the element 27, releasing the force applied to the belt 28.

Figure 6:
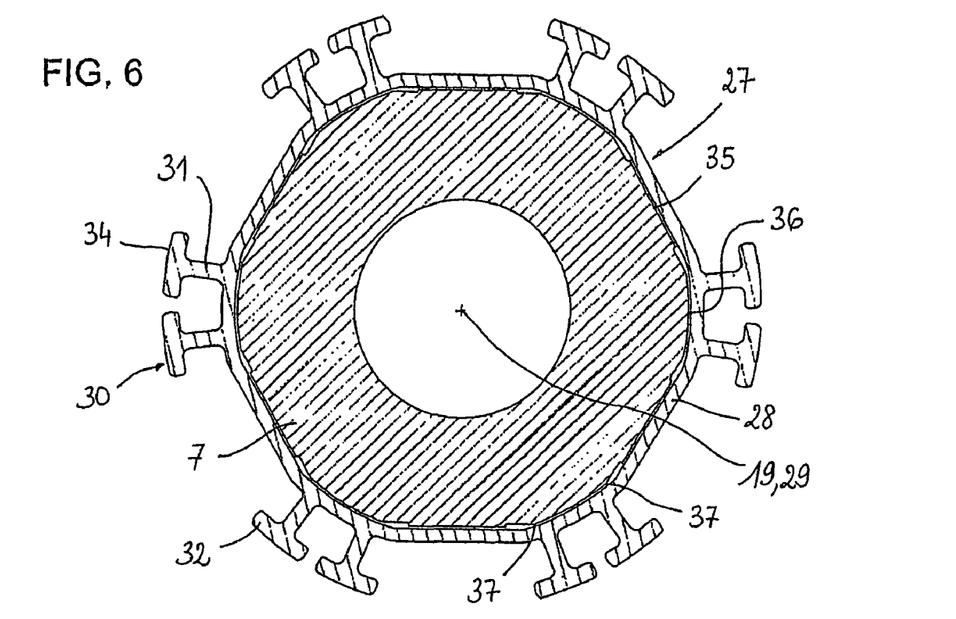
FIG. 6 is a view similar to FIG. 4, showing another possible mounting of the element.

In the case of a stator 7 with flats 35, it is possible, once the element 27 has been put in place, to apply a force to the belt 28 at the location of the flats 35 so as to locally deform the belt 28 and bring about a situation in which it is substantially in contact with the stator 7 over its entire inner area, thus providing even better retention (see FIG. 6).

Figure 7A:
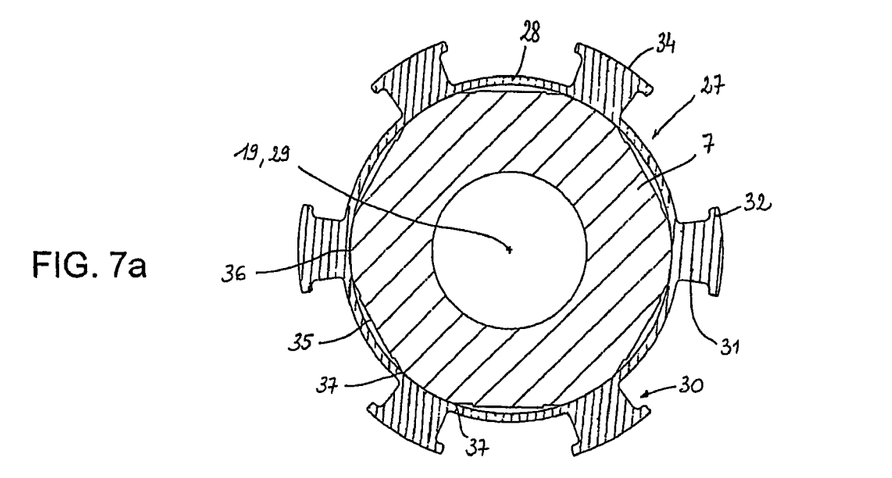
FIG. 7a is a view in cross section of a stator comprising flats and equipped with an element according to a second embodiment.
Figure 7B:
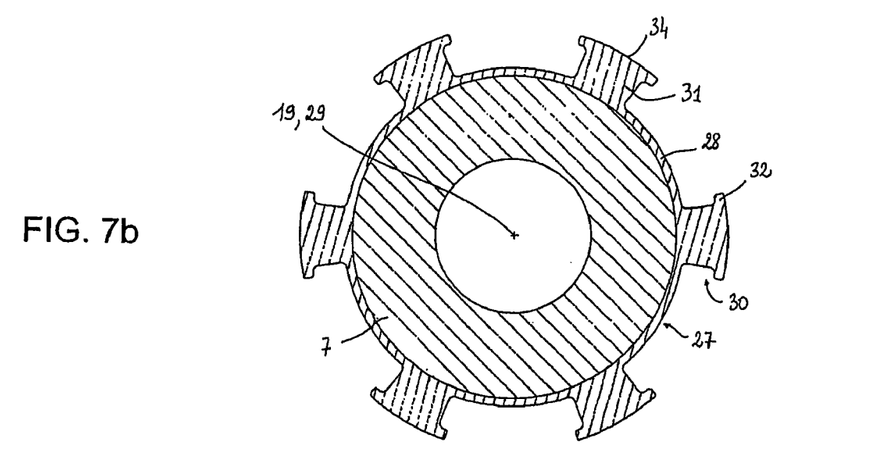

According to a second embodiment represented in FIGS. 7a and 7b, the element 27 no longer comprises six sets of two bearing members 30 but six bearing members 30 equally distributed around the periphery of the belt 28. As above, each bearing member 30 comprises an arm 31 and a pad 32 possessing a bearing surface 34 situated on the lateral face of an imaginary cylinder of revolution of axis 29 and of diameter De34.

In this embodiment, the bearing members 30 are more solid than in the embodiment shown in FIG. 2 and generally appear to be a combination of two bearing members 30 of one and the same assembly shown in FIG. 2 in which the space between them has been filled. Each arm 31 thus has a width of between 10 and 50 mm.

The element 27 can be put in place, substantially coaxially and with clamping, around a cylindrical stator 7 of revolution (FIG. 7b) or provided with flats 35 (FIG. 7a). In the latter case, the bearing members 30 are situated in line with the cylindrical portions 36 separating two consecutive flats 35, and the width of the arms 31 can correspond substantially to the width of said cylindrical portions 36 (along the periphery of the stator 7).

Figure 8A:
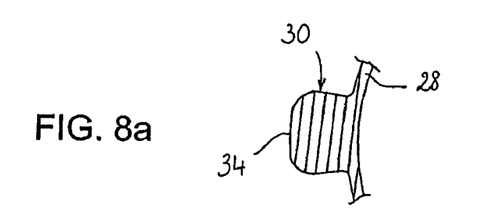
FIGS. 8a and 8b are detail views, in cross section, of a bearing member according to two variants of the second embodiment.
Figure 8B:
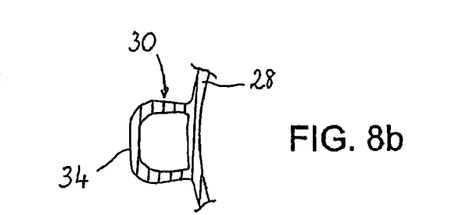

In the variant shown in FIG. 8a, the bearing member 30 has the shape of a solid rounded boss from which there does not protrude a pad as is the case in FIGS. 7a and 7b. This boss can also be hollow, as illustrated in FIG. 8b.

Figure 9:
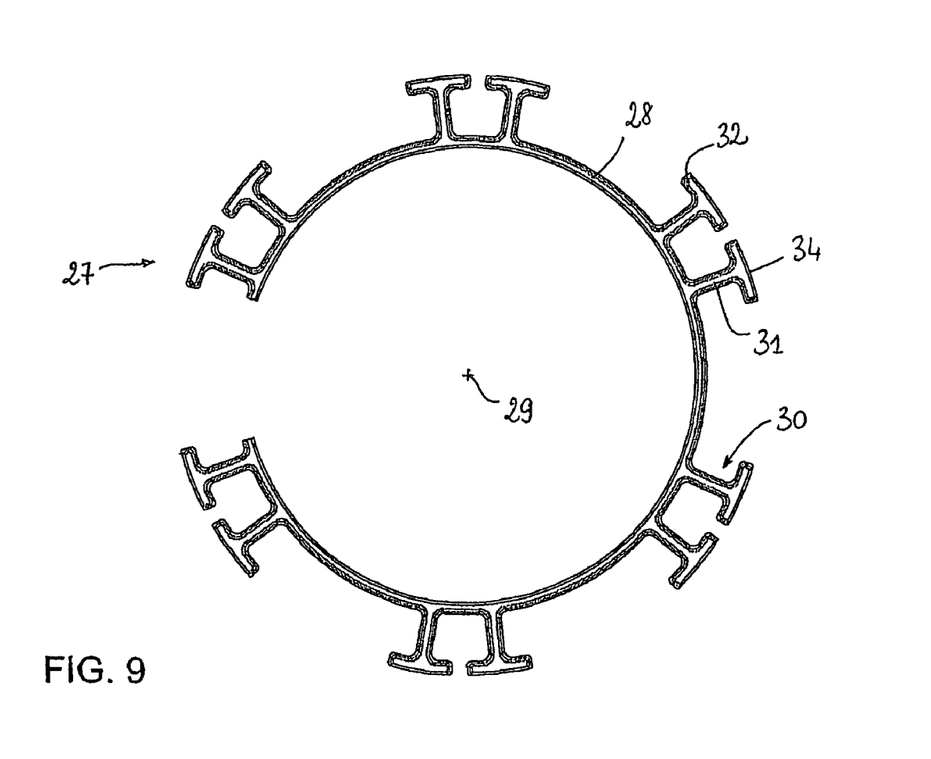
FIG. 9 is a plan view of an element according to a third embodiment.

According to a third embodiment, illustrated in FIG. 9, the belt 28 of the element 27 is open and extends over an angle of around 320°. This achieves a greater freedom of deformation for the belt 28 which, as a result of elastic return, can produce very good clamping around the stator 7, even though it is not closed. The opening is located between two sets of bearing members 30 or two bearing members 30. These bearing members 30 and their arrangement can be identical to those shown in FIG. 2, 3 or 7a, 7b or 8a or 8b.

Figure 10:
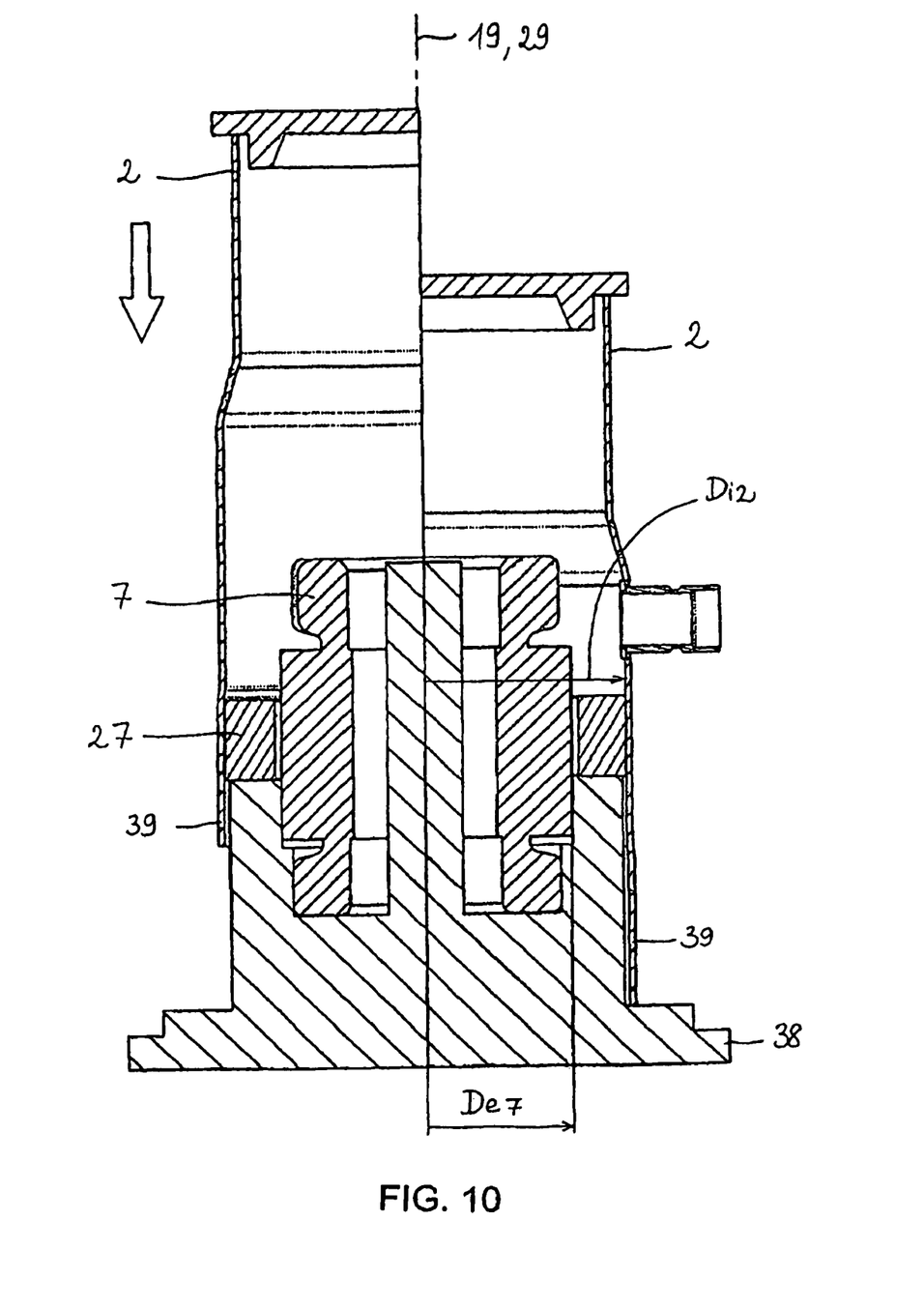
FIG. 10 is a schematic representation in longitudinal section of two steps of the method of mounting the stator/element assembly in the shell of the compressor.

Once the element 27 has been mounted around the stator 7, the stator 7/element 27 assembly is mounted in the shell 2, in the cylindrical portion thereof. To this end, as illustrated in FIG. 10, the stator 7 equipped with the element 27 is placed on a support 38 of suitable shape. The shell 2 is then placed coaxially to the stator 7 and moved toward the latter. The lower portion 39 of the shell 2 can have an inside diameter which is slightly greater than the inside diameter Di2 of the cylindrical portion of the shell 2 that is intended to receive the motor 2, so as to facilitate the insertion of the stator 7/element 27 assembly in the shell 2.

Once the element 27 has been mounted around the stator 7, the outside diameter De34 will be slightly greater than the inside diameter Di2 of the shell 2 so as to allow a forced mounting and a tight fit between the element 27 and the shell 2, in order to guarantee a very good retention of the motor 2 in the compressor 1.

It is also possible not to have any initial clamping between the belt 28 and the stator 7 (the inside diameter Di28 of the belt 28 being slightly greater than the outside diameter De7 of the stator 7). The stator 7 and the belt 28 can be simply set down coaxially on the support 38. If appropriate, the belt 28 can be adhesively bonded around the stator 7 to facilitate handling of the assembly. The clamping of the shell 2 around the element 27 is thus what will cause the belt 28 to be clamped around the stator 7.

The hard bracing of the element 27 on the shell 2 is transmitted to the bracing of the belt 28 on the stator 7 which, initially soft, becomes hard. In this way it is possible to avoid not only the problems of impacts due to transportation and handling but also the risks that the stator might lose its geometric assembly position on account of its mass.

When the stator 7 is installed in the shell 2 by way of the element 27, the forces are exerted by the shell 2 on the bearing faces 34 of the pads 32 of the bearing members 30. Furthermore, the bearing members 30 transmit this force to the belt 28, at the location of regions which bear on the stator 7, which, in the case of a stator having flats 35, are situated at the location of the cylindrical portions 36 of the stator 7.

The cylindrical shape of revolution of the belt 28, the equal distribution of the bearing members 30 over the periphery and their radial alignment with the bearing regions between the belt 28 and the stator 7 are all equally elements which make it possible to improve the stability of the fastening of the motor 6 in the compressor 1.

The presence of solid bearing members 30 or the pairing of T-shaped bearing members 30 facilitates both the deformation of the belt so that it can be put in place around the stator 7 and the retention of the motor 6.

It goes without saying that the invention is not limited to the embodiments described above by way of examples but that, on the contrary, it embraces all variant embodiments thereof.

The invention claimed is:

1. An element for positioning and retaining a stator of an electric motor of an outside diameter in a substantially cylindrical portion of a compressor shell whose inside diameter is greater than the outside diameter of the stator, wherein the element comprises:
    a cylindrical belt of revolution having a continuous cylindrical outside surface and a continuous cylindrical inside surface, the belt having substantially constant thickness and having an inside diameter which is substantially equal to the outside diameter of the stator so that the belt can be mounted substantially coaxially with clamping around the stator; and
    a plurality of bearing members projecting radially outwardly from the outside surface of the belt and each having a face for bearing on the shell, said bearing faces being situated on the lateral face of an imaginary cylinder of revolution having the same axis as the belt and having a diameter which is substantially equal to the inside diameter of the shell, such that the positioning and retaining element can be mounted with clamping inside the shell.

2. The element as claimed in claim 1, wherein at least one of the bearing members comprises an arm extending radially outwardly from the belt and a pad arranged at the outer end of the arm, said pad having the shape of a cylinder portion which is coaxial with the belt and extends over an angle of between 5 and 40°.

3. The element as claimed in claim 2, wherein, as seen in cross section, the bearing member has a T shape, the width of the arm being between 15 and 35% of the width of the pad.

4. The element as claimed in claim 2, wherein, as seen in cross section, the width of the arm is greater than 60% of the width of the pad.

5. The element as claimed in claim 1, wherein at least one of the bearing members consists of a locally thicker portion of the belt, forming a solid or hollow boss.

6. The element as claimed in claim 1, wherein the radial length of the bearing members is between 8 and 50 mm.

7. The element as claimed in claim 1, wherein the element comprises a plurality of sets of the plurality of bearing members, said sets being substantially equally distributed around the periphery of the belt.

8. The element as claimed in claim 7, wherein at least one of the sets comprises two bearing members.

9. The element as claimed in claim 1, wherein the belt is open and extends over an angle above 270°.

10. The element as claimed in claim 1, wherein the element is obtained by extrusion and then cutting to a predetermined axial height.

11. A compressor comprising:
    a substantially sealed enclosure delimited by a shell comprising at least one substantially cylindrical portion of inside diameter;

an electric motor arranged inside the substantially cylindrical portion of the shell, said motor comprising a stator whose outside diameter is smaller than the inside diameter of the shell;

wherein the compressor additionally comprises the positioning and retaining element as claimed in claim 1, said element being mounted substantially coaxially, with clamping, around the stator and inside the shell.

12. The compressor as claimed in claim 11, wherein the bearing members are arranged on the belt substantially in line with bearing regions between said belt and the stator.

13. The compressor as claimed in claim 11, wherein the outer face of the stator is substantially cylindrical.

14. The compressor as claimed in claim 11, wherein the outer face of the stator is substantially cylindrical except for at least one flat, the bearing members being arranged facing a cylindrical portion or cylindrical portions of the stator.

15. The compressor as claimed in claim 14, wherein the outer face of the stator comprises a number of substantially identical flats equally distributed around the periphery of the stator and separated by cylindrical portions forming the bearing regions between the belt and the stator, at least one of the plurality of bearing members being arranged in line with each of the cylindrical portions of the outer face of the stator.

16. The compressor as claimed in claim 15, wherein at the location of at least one of the cylindrical portions of the outer face of the stator, the positioning and retaining element comprises two angularly separated bearing members each arranged in line with an edge between said cylindrical portion and the adjacent flat.

17. A method of mounting an electric motor in the enclosure of a compressor, comprising the steps consisting in:

providing a substantially sealed enclosure delimited by a shell comprising at least one substantially cylindrical portion of inside diameter, providing a stator of an electric motor whose outside diameter is smaller than the inside diameter of the shell;

wherein the method additionally comprises the steps of:

providing a positioning and retaining element as claimed in claim 1;

mounting said element around the stator substantially coaxially;

mounting the stator/element assembly inside the shell substantially coaxially, with clamping;

producing a clamping effect between said element and the stator.

18. The method as claimed in claim 17, wherein the clamping effect between the element and the stator is obtained:

by mounting the element around the stator with force;

or by mounting the element, which has been thermally expanded beforehand, around the stator and then cooling the element, causing the material constituting said element to shrink;

or as a result of the clamping effect produced between the element and the shell.

19. The method as claimed in claim 17, wherein the method comprises the steps consisting in:

providing a stator having a substantially cylindrical outer face with the exception of at least one flat;

applying an inwardly directed substantially radial force to the belt of the element, at the location of a deformation region not situated in line with a bearing member, so as to elastically deform said belt;

placing the stator and the element in a substantially coaxial manner and in a mutual angular orientation such that the flat is substantially axially aligned with the deformation region;

inserting the stator into the element;

releasing the force applied to the belt so that the belt is mounted around the stator with a tight fit.

\* \* \* \* \*